United States Patent [19]
Kinoshita

[11] 3,985,545
[45] Oct. 12, 1976

[54] METAL MELTING METHOD USING ELECTRIC ARC FURNACE

[76] Inventor: Sadamu Kinoshita, 389, 7-chome, Ohzumachi, Hiroshima, Japan

[22] Filed: Jan. 21, 1975

[21] Appl. No.: 542,811

Related U.S. Application Data

[60] Division of Ser. No. 323,129, Jan. 12, 1973, Pat. No. 3,876,257, which is a continuation-in-part of Ser. No. 122,463, March 9, 1971, abandoned.

[30] Foreign Application Priority Data
Sept. 24, 1970 Japan................. 45-83233
Sept. 24, 1970 Japan................. 45-83234

[52] U.S. Cl........................... 75/12; 75/11
[51] Int. Cl.² ........................ C21C 5/52
[58] Field of Search ................... 75/11, 12

[56] References Cited
UNITED STATES PATENTS

| | | | |
|---|---|---|---|
| 2,775,518 | 12/1956 | Udy | 75/11 |
| 3,150,961 | 9/1964 | Collin | 75/11 |
| 3,163,520 | 12/1964 | Collin | 75/11 |
| 3,276,859 | 10/1966 | Collin | 75/11 |
| 3,615,346 | 10/1971 | Reth | 75/11 |
| 3,715,200 | 2/1973 | Archibald | 75/11 |

*Primary Examiner*—Peter D. Rosenberg
*Attorney, Agent, or Firm*—Oblon, Fisher, Spivak, McClelland & Maier

[57] ABSTRACT

An electric arc furnace of the closed type for melting metals, having three heating electrodes and equipped with raw material charging inlets and a tapping hole in the furnace body. The three electrodes are arranged in a substantially straight line, and the raw material charging inlets are arranged in the furnace trunk or body so as to permit raw materials in chip form to be fed into the furnace in parallel with the line of the three electrodes. The raw material charging inlets also serve to exhaust dust and smoke produced in the course of operating the electric furnace.

2 Claims, 9 Drawing Figures

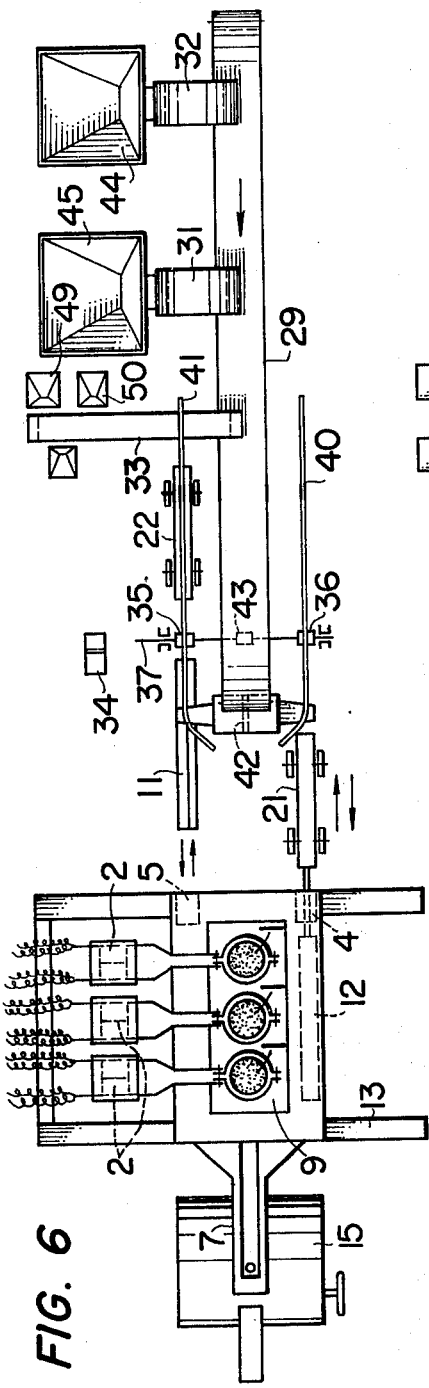
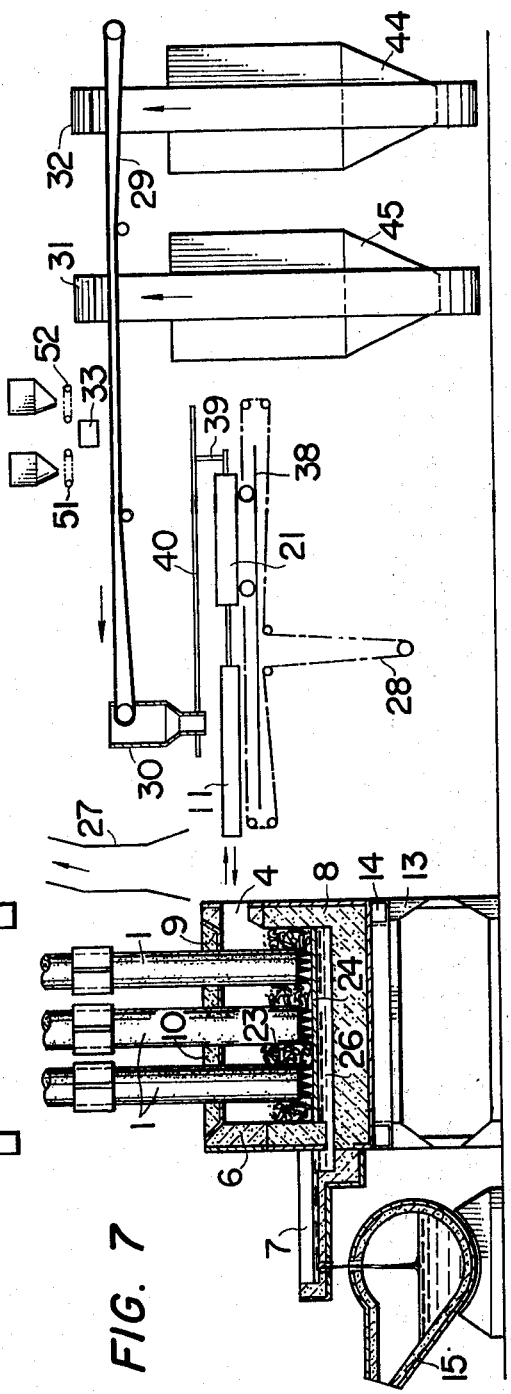
FIG. 6
FIG. 7

METAL MELTING METHOD USING ELECTRIC ARC FURNACE

CROSS REFERENCE TO RELATED APPLICATION

This application is a division of application Ser. No. 323,129, filed Jan. 12, 1973, now U.S. Pat. No. 387,257, which is a continuation in-part of application Ser. No. 122,463 to Sadamu Kinoshita, filed Mar. 9, 1971, assigned to the same assignee as the present application, and now abandoned.

BACKGROUND OF THE INVENTIONS

1. Field of the Invention

The present invention relates generally to an electric arc furnace for melting metals, and more particularly to an electric arc furnace for melting metals which is capable of charging, melting, refining, and tapping on a continuous basis, and also to a method of melting cast iron by using the furnace.

2. Description of the Prior Art

Conventionally, the melting of metals by using an electric arc furnace is carried out by using raw materials supplied in one or more separate charges up to the capacity of the furnace and the molten or refined metal is tapped at one time. That is to say, in conventional electric furnaces, the charging and melting raw materials, and the tapping of molten metals are independent and intermittent operations, varying in volume in accordance with the size of the furnace. Conventional furnaces face the disadvantage that the adding of raw materials and tapping of refined metal require heavy labor. This is true, since if the tapping of large quantities of refined metal is done at one time, the temperature of the molten metal falls before it is treated or cast, causing differences in casting temperatures of the molten metal in individual castings, resulting in poor quality castings. Since molten metal which has been tapped in quantity at a given time must be handled quickly, large scale casting operations can be laborious, causing fatigue on the part of the workers involved.

Moreover, in the melting of metals, especially cast iron and nodular graphite cast iron, conventional melting processes are not efficient, particularly in removing harmful sulfur contained in the cast iron and in refining through deoxidation. The reason is that in such melting or refining, it is nearly impossible to prevent production of oxides of silicon (Si) in the molten metal. The presence of silicon oxides causes shrinkage cavities, resulting in the production of pin-holes or drossy scum, or other imperfections in the castings made of such molten metal. As these complications are nearly unavoidable in conventional melting methods, solutions have been sought in the metal melting process, a most difficult problem.

Another problem with the conventional electric arc furnace is the inevitable production of dust and smoke in great volume during metal melting operations. This is a serious problem, especially because of air pollution. It cannot be prevented or reduced in conventional furnaces because of the difficulty in completely enclosing the top of the furnace due to the arrangement of electrodes in the form of a regular triangle on the top of the furnace. In addition, it is impossible to close up conventional furnaces and add dust collectors thereto due to their structure, which requires inclining the furnace, for ease in tapping molten metals.

SUMMARY OF THE INVENTION

Accordingly, it is an object of the present invention to solve the above-mentioned complications and other problems of conventional electric arc furnaces, and, therefore, to provide an electric arc furnace for melting metals which is capable of charging, melting and refining raw materials and tapping molten, refined metal continuously, particularly high quality cast iron and nodular graphite cast iron.

Another object of the present invention is to provide an electric arc furnace for melting metals which is substantially completely enclosed and is capable of charging raw materials and tapping molten metal continuously and automatically, and which prevents dust and smoke produced inside it from being dispersed into the atmosphere.

Still another object of the present invention is to provide an electric arc furnace for melting metals which is compact in size yet larger in melting capacity than conventional furnaces of the same size, and is also low in construction cost.

Still another object of the present invention is to provide an electric arc furnace for melting matels and a metal melting method using said furnace, thereby making it possible to carry out complete deoxidation-desulfurization refining of molten cast iron in the course of melting without production of harmful oxides of silicon by maintaining the atmosphere in the furnace strongly reductive.

A further object of the present invention is to provide an electric arc furnace for melting cast iron which is capable of producing, at low cost, molten cast iron of good quality and of very low sulfur content after complete deoxidation and desulfurization, from cheap raw materials in chip or granular form and of poor quality containing high sulfur concentrations, such as pig iron and steel cutting chips.

A still further object of the present invention is to provide a raw material charging apparatus which is capable of charging raw materials automatically or continuously for melting in an electric arc furnace and tapping molten metal therefrom continuously.

These and other objects are achieved by using an electric arc furnace of the closed type for melting metals. The furnace includes three electrodes and is equipped with raw material charging inlets and a tapping hole in its body portion (trunk). The furnace includes three electrodes arranged in a substantially straight line, and raw material charging inlets are provided in the upper part of the furnace wall so as to permit charging of raw materials in a line which is parallel with the line of the electrodes. The charging inlets are also designed to exhaust dust and smoke produced in the furnace in the course of the melting operation. The furnace is virtually completely enclosed, except for the charging inlets, so as to maintain a strongly reductive atmosphere, when necessary. A molten metal tapping hole is provided in the bottom of the furnace, preferably on the opposite side from the charging inlets. A raw material charging apparatus is attached to the furnace to automatically supply raw materials for melting. A cast iron melting method is also disclosed which comprises charging a furnace continuously and automatically, through raw material charging inlets, with raw materials such as chip or granular pig iron, steel cutting chips or granular iron, mixing such materials with granular subsidiary materials (such as carbon powder, calcium carbide ($CaC_2$), lime (CaO), ferrosilicon (Fe—Si) or silicon carbide (SiC), melting the materials with an electric arc in a closed furnace, making the molten metal into sprays, and passing the sprays through a slag filtering layer previously provided so that such sprays may be subjected to deoxidation-desulfurization refining. The efficiency of such refining is enhanced by maintaining the atmosphere in the furnace reductive by tight enclosure of the furnace or by utilizing the reductive capacity of a carbon atmosphere at a high temperature produced by the furnace arc, and then continuously tapping the highly refined molten cast iron through a slag filtering layer.

BRIEF DESCRIPTION OF THE DRAWINGS

Various objects, features and attendant advantages of this invention will be more fully appreciated as the same becomes better understood by reference to the following detailed description when considered in connection with the accompanying Drawings, wherein.

DESCRIPTION OF THE PREFERRED EMBODIMENT

Figure 1:
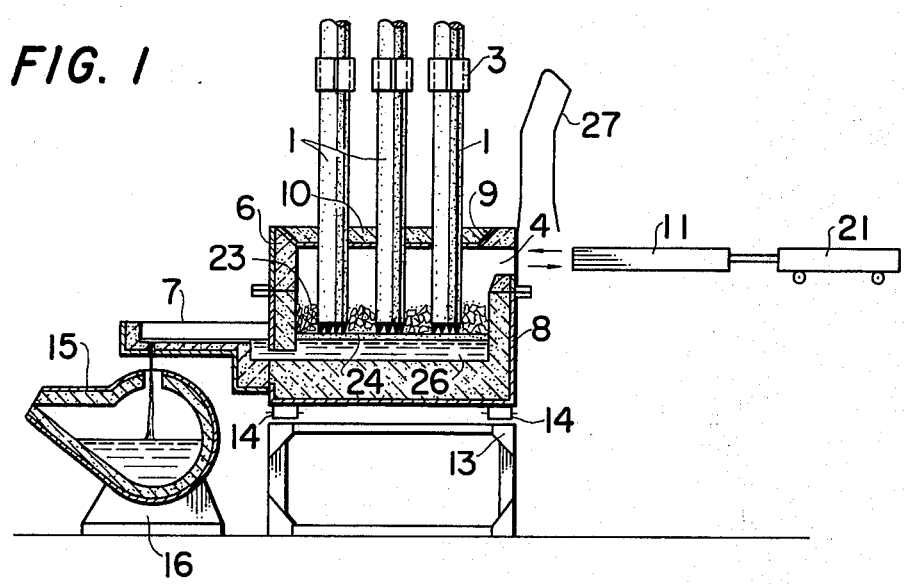
FIG. 1 is a cut away cross-sectional view of one embodiment of the electric arc furnace of the present invention.

The following is an explanation of the present invention with respect to the preferred embodiment illustrated in the Drawings.

Figure 2:
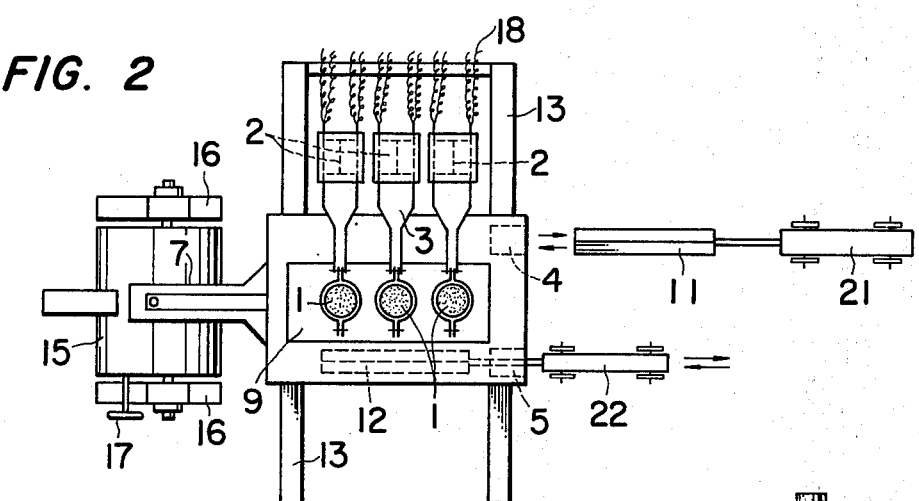
FIG. 2 is a cut away top view of the electric arc furnace of FIG. 1.
Figure 3:
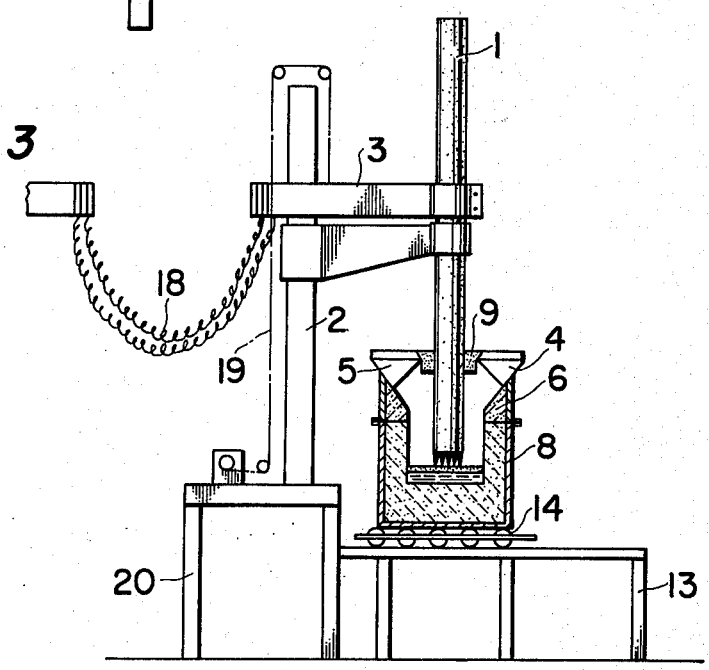
FIG. 3 is a cut away front view of the electric arc furnace of FIG. 1.

As shown in FIGS. 1 to 3, the electric arc furnace of the present invention includes three electrodes 1 arranged in a substantially straight lilne and an electrode retaining, raising and lowering apparatus 3. An upper furnace trunk or body 6, having a cross-section of nearly rectangular form, is shown as having three electrodes 1 set free for moving up and down through tightly sealed apertures in the trunk. The trunk 6 has two raw material charging inlets 4 and 5 positioned nearly in parallel with the line of the electrodes 1 for charging raw materials into the furnace. The furnace has a lower trunk 8 also having a cross-section of nearly rectangular form tightly connected to said upper furnace trunk 6. The lower trunk 8 has a tapping hole 7 positioned nearly opposite to the charging inlets 4 and 5.

An electrode retaining, raising and lowering apparatus 3, which may be of a conventional type, is shown fixed on a support 2. The part of the upper furnace trunk 6 through which said electrodes 1 are raised and lowered is completely enclosed by an appropriate metal frame 9 containing a refractory filler 10.

In the conventional electric arc furnace, the electrodes are, almost without exception, arranged so as to form a regular triangle, making it difficult to enclose the upper section of the furnace containing the electrodes.

In contrast, in the electric arc furnace of the present invention, it is easy to completely enclose the furnace because the three electrodes are arranged nearly in a straight line. This consistutes one special characteristic of the present invention.

Two window-like raw material charging inlets 4 and 5 are provided close to one another on the upper furnace trunk 6, to permit charging of raw materials from both sides of the line of electrodes. The charging inlets 4 and 5 may be placed on the upper furnace trunk 6 at as high as possible, so that dust and smoke produced in the furnace can be exhausted through them, thereby making it easy to provide a fume and dust collecting hood 27 close thereto. As raw materials may be in powder or granular form, said charging inlets 4 and 5 need not be large-sized, making it easy to close up the furnace. Moreover, the size of these charging inlets 4 and 5 is so designed that they can be open while a positive pressure is maintained inside the furnace, thereby making it possible to discharge dust and smoke produced in the furnace and also charge raw materials at such positive pressure. This is another special characteristic of the present invention, which makes it possible to continuously and/or automatically charge, melt and refine raw materials in the electric arc furnace of the present invention. It also permits the tapping of molten metal therefrom while preventing production of smoke, which causes an environmental problem, and also keeping the inside of the furnace in a sealed state, which makes the atmosphere in the furnace strongly reductive and makes possible melting and refining at high efficiency, and particularly prevents production of harmful oxides of Si in the melting of cast iron.

In order to facilitate continuous and uniform distribution of raw materials on both sides of the electrodes 1, the charging inlets 4 and 5 are triangular in shape so that buckets 11 and 12 having triangular cross-sections may be inserted through them. With about 90° rotation, buckets 11 and 12 can distribute granular raw materials all over both sides of the line of electrodes.

This bucket system for charging raw materials is so designed that said buckets 11 and 12 are put into and taken out of the furnace alternatively through respective charging inlets 4 and 5.

The shape of the charging inlets 4 and 5 need not always be triangular but may also be square, semi-circular or otherwise shaped. Regarding the charging method, any direct and continuous charging systems such as conveyor systems will do, as well as the above-mentioned charging system which relies upon reciprocation of buckets.

In the electric arc furnace of the present invention, the upper furnace trunk 6 and the lower furnace trunk 8 preferably have a rectangular cross-section, but any shape, such as a circle or ellipse, will do.

The upper and lower furnace trunks 6 and 8 are made of steel plate or iron shell lined inside with a refractory material. This division of the furnace into two parts makes it posssible to design the furnace such that the lower furnace trunk 8 is placed on a stand 13 and supported by a great number of moving rollers 14, thereby being made movable to facilitate replacement or repair of the trunk. Aslo, because the lower furnace trunk 8 is used continuously for melting and refining, it is subjected to severe wear and tear, as compared with upper furnace trunk 6. The above-mentioned construction in making the lower furnace trunk replaceable will raise operation efficiency and lower repair costs of the furnace. However, the furnace may also be constructed as a whole, without separation into upper and lower furnace trunks 6 and 8, when such is desirable.

A tapping hole and its spout 7 is provided on the lower furnace trunk 8 opposite the charging inlets 4 and 5 provided on the upper furnace trunk 6. The structure and position of the tapping hole and its spout 7 forms a syphon system, the tap of which is provided on the same level as the furnace bottom, as shown in the Drawings. This design facilitates continuous tapping of molten metal from a furnace hearth 26, where molten metal collects drop by drop after having been made into sprays by the arc, and passing through the previously prepared slag filtering layer. Before tapping, the molten metal is collected in a fore-furnace 15 provided close to the tapping hole 7.

The fore-furnace 15 is constructed on a stand or supporting table 16, so as to be easily inclined by the turning of a handle 17, making it possible to discharge the collected molten metal when necessary. Because the molten metal produced by the electric arc furnace of the present invention (particularly molten cast iron) has been completely deoxidized and desulfurization, it flows easily, and cools very slowly, making it practical for the molten metal to be left for a long time in the force-furnace 15. Thus, the discharging and casting of molten metal according to the present invention are made much more efficient as compared with conventional discharging and casting methods.

The above are special characteristics of the electric arc furnace of the present invention paritcularly useful in producing molten cast iron. However, the furnace is not limited to molten cast iron, and such metals as steel and aluminum can also be melted.

In the above embodiment of the present invention, the numeral 18 indicates lead wires for supplying electricity to the electrodes 1. The numerals 19 indicates suspending wires for lifting and lowering the electrodes 1. The numerals 21 and 22 indicate devices for moving buckets 11 and 12, respectively, which may be driven by a force supplied from outside, so as to insert and retract the buckets from charging inlets 4 and 5. The buckets 11 and 12 are turned or dumped by an appropriate camming or guiding device in the furnace, thereby charging raw materials on both sides of the line of electrodes.

Figure 8:
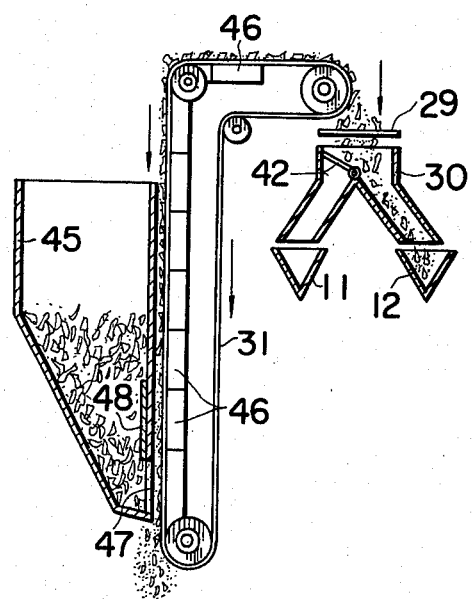

In FIGS. 6, 7 and 8 is shown an embodiment of a raw material charging apparatus attached to the electric arc furnace of the present invention. When using this apparatus, raw materials in scrap form can be charged continuously as melting in the furnace progresses. The apparatus consists mainly of two raw material charging buckets 11 and 12 which are so devised as to go into and come out through the two raw-material charging inlets 4 and 5. Devices are provided for driving and turning buckets 11 and 12, so that these buckets go into and come out through the charging inlets 4 and 5 alternatively. A horizontal belt conveyor 29 is provided for loading scrap material into buckets 11 and 12. Two magnet vertical belt conveyors 31 and 32 are provided for transferring raw materials to horizontal belt conveyor 29. Two raw material tanks or hoppers 44 and 45 are also provided for storing material.

The devices for driving reciprocally and dumping the charging buckets 11 and 12 include wire drums 35 and 36 which are driven by means of a motor 34 through a drive shaft 37. As the process is the same for the two buckets, only the operation of bucket 11 will be described in detail.

Referring to FIG. 7, a wire 28 is fastened to a truck 21, which runs on a slide rail 38 to push the bucket 11 forward. The forward movement makes a guide 39 set on a bucket shaft at the rear end of the truck 21 run along the inside of a guide rail or camming surface 40, causing the bucket 11 to rotate in the furnace, dumping its contents.

The drums 35 and 36 for buckets 11 and 12, respectively, are connected to the drive shaft 37 by wires which are wound several times around the shaft in opposite directions, so that the buckets 11 and 12 undergo reciprocal motion, one counter to the other. Guide or cam rails 40 and 41 are provided respectively to cause the buckets to rotate and dump toward the end of their forward movement.

For the reciprocal movement of the buckets 11 and 12 there is provided a limit switch for reversing motor 34. Alternatively, an appropriate switch in combination with a reduction gear may be provided. The numeral 43 indicates a manual induction releasing clutch.

In the above-described reciprocating and dumping device, other types of camming surfaces than rails can be used, and rollers and/or gears may be substitued for the wires and drums.

The belt conveyor system for charging raw materials, consists of a horizontal endless belt 29, a hopper 30 set at the end of the conveying distance, and a dumper or chute 42 to alternately fill bucket 11 and bucket 12 with raw materials from said hopper 30.

As shown in FIG. 8, the above-mentioned magnet vertical belt conveyors 31 and 32 are so constructed that only raw materials of iron content are attracted by the magnetic force of permanent magnets set inside these conveyors. Materials from the tanks or hoppers 44 and 45 are transported upward on these conveyors, to be transferred onto the horizontal belt conveyor 29. Tanks or hoppers 44 and 45 have, respectively, raw material outlets 47 equipped with vertically sliding adjusting plates 48. The use of such magnetic conveyors makes possible automatic separation of iron from such harmful impurities as non-ferrous metals, sand, and earth, when raw materials are in powder or granular form. This is a great advantage obtainable from using raw materials in powder or granular form.

Regarding the preparation of raw material charges, the speed of magnetic conveyors 31 and 32 is adjusted to have their magnets attract new materials according to kinds, such as iron cutting chips, steel cutting chips, and granular iron which may be separately stored in respective tanks 44 and 45, and so on.

Also, regarding the preparation of subsidiary material charges, conveyors 51 and 52 carry prescribed amounts of such subsidiary materials as carbon powder, $CaC_2$, Fe—Si and SiC separately stored in, and charged from, tanks 49 and 50 and so on. These conveyors then transfer these materials to conveyor 33, which transfers them further to conveyor 29.

These belt conveyors for transporting raw materials and subsidiary materials can be replaced by bucket conveyors, moving intermittently at the same speed or at different speeds.

The following is an explanation of the assembly of the furnace adnd of a method cast iron according to the present invention by using the electric arc furnace of the present invention.

Figure 4A:
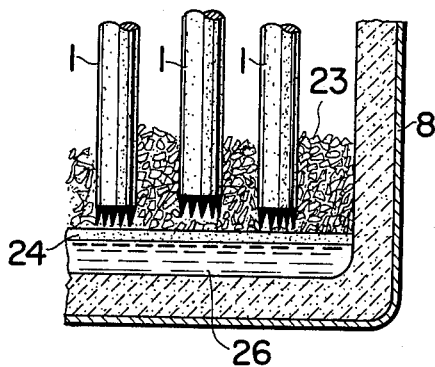
FIG. 4 (A) is an enlarged cross-sectional view of the electric arc furnace of the present invention as it is operating according to the metal melting method of the present invention.
FIG. 4(B) is an end view of the electric arc furnace shown in FIG. 4(A)

The lower furnace trunk 8 which may have been repaired, for example, is first carried on the rollers 14 to a position right below the upper furnace trunk 6, pushed up with a jack or the like, and tightly connected with the upper furnace trunk 6. Then, the electrodes 1 are lowered to a position near the bottom of the furnace. Then, as shown in FIGS. 6, 7 and 8, such powdered materials as pig iron and steel chips are charged through the charging inlets 4 and 5 by the buckets 11 and 12. As for the order of charging raw materials, the first charged is a slag forming material containing calcium carbide ($CaC_2$) in a greater part, which is followed by a powder material made by mixing pig iron and steel chips, $CaC_2$, and carbon powder, if necessary, with Fe—Si, SiC and the like. When such materials have been charged to some part of the total requirement, the introduction of electricity for melting starts. Immediately after the start of melting, the furnace is wholly closed up, except the charging inlets 4 and 5, which permit the atmosphere in the furnace to be maintained at a positive pressure. Maintaining the atmosphere in the furnace at a positive pressure and strongly reductive, by permitting no entry of air from outside, causes carbon monoxide produced in the course of melting to ascend through gaps between charged raw materials and partly reacts with oxygen contained in the raw materials 23 to form carbon dioxide, which, after having heated the raw materials 23, is exhausted with dust produced in the furnace through the charging inlets 4 and 5. The exhausted gas and dust are collected easily and completely by a dust collecting hood 27 placed close to the charging inlets 4 and 5. The raw materials 23 charged in powder or granular form melt, as shown in FIG. 4(A), due to an arc produced right below the electrodes 1, and the so molten metal is made into sprays by impact of the arc. The molten metal tn passes in the form of drops through the slag layer 24, which has been prepared, is filtered and refined by the passage through the layer 24, and descends into the molten metal hearth 26. By the passage through said slag layer 24, the drops of molten steel are deoxidized and desulfurized for complete refining in a moment. This is especially efficient because no oxides of Si are produced due to the strongly reductive atmosphere in the furnace. Removal of these oxides would be extremely difficult using conventional methods and furnaces. The slag layer 24 is formed purposely first by adding a charge of a slag forming agent and is maintained by the continuous feeding of $CaC_2$, CaO and the like from the charged raw materials 23.

Figure 4B:
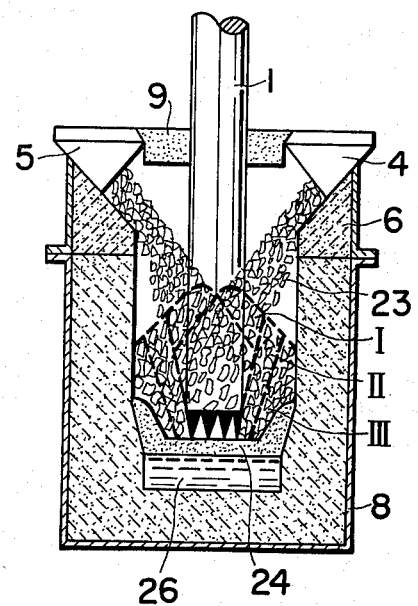

Special characteristics of the above-mentioned method of melting cast iron are described in detail below:

As shown in FIG. 4(B), the charging of the raw materials 23 is carried out so as to cover the arc produced by the electrodes 1, thus making heaps of raw materials 23 are succesively heated from the bottom directly by the arc produced by the electrodes 1, to be speedily melted into drops of molten cast iron. In other words, the raw materials 23, which have been charged to make such heaps around the electrodes 1 as shown in the drawings, are heated successively from the parts thereof close by the arcing portions of the electrodes 1, reducing their magnetism and causing them to slide down from the sides of the electrodes 1 in the order of the sections (I), (II) and then (III) to a position below the electrodes 1. The raw materials 23 which have thus descended to a position below the electrodes 1, are heated by a high temperature arc (about 3000°) to be instantaneously melted into drops of molten cast iron. The drops of molten metal are made into countless numbers of fine particles (of about 1.0 about 3.0 mm in diameter) by the impact of the arc simultaneously with the melting, and they are formed into a state of spray, similar to rainfall, and are jetted against the strongly basic slag layer 24, which has been forcedly formed below the electrodes 1, so as to pass through the same. In this case, the particle size of the raw materials 23 should be made small enough for electric heat capacity, as mentioned above.

As for the slug layer 24, it functions not only as a filter of the drops of molten metal but also as a check or stop for the drops just after they are produced by the arc and filtered, and prevents them from coming into contact with the raw materials 23. For this purpose, the slag layer 24 is formed to cover the whole space against the lower tip of the electrodes 1, with the peripheral parts or edge portions of the slag layer turned upward to form a pan-like container as shown in the drawing. The pan-like slag layer also aids the sliding down of the raw materials 23 in a smooth and sure manner along it to a position below the electrodes 1, and contact between the drops, just after they are produced and filtered, with the raw materials 23 is also effectively prevented, as mentioned above.

The slag layer 24 shaped like a pan can be easily and effectively formed by a reduction, as shown in the drawing, of the original form, preferably a rectangle, extending from the area for receiving the raw materials 23 or molten metal, down to the molten metal hearth 26. The filtered and refined drops of molten cast iron descend drop by drop into the molten metal hearth 26. The molten cast iron, which falls in drops, is pooled in the forefurnace 15 or the like, and is taken up by a ladle or the like when necessary. The above described method intended for use with the electric arc furnace of the present invention, may also be feasible in electric arc furnaces of the closed type having three electrodes arranged to form a regular triangle.

When using the above described metal melting method of the present invention, no use of any special desulfurizing agent nor addition of special alloys is necessary. Even without such use or addition, the reduction of the sulfur content of molten metal, which is extremely difficult to accomplish in furnaces according to conventional methods, is made possible by using the method of the present invention, so that the sulphur content of molten cast iron decreases to from 0.005 to 0.003% from the 0.08% in the raw materials which may be in the form of low grade chips. Also, the reduction of the oxygen content to less than 10 ppm is another effect of the method of the present invention. Such effective desulfurization and deoxidation are due to the high activity of the slag layer 24 and the subdivision of the drops of molten metal into fine sizes. Furthermore, the slag layer 24 absorbs such harmful substances as oxides of silicon through the formation of slag therefrom.

Figure 5:
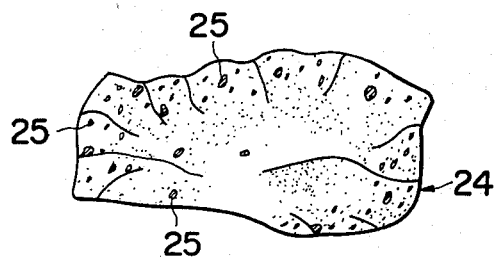
FIG. 5 is an illustration of part of a crushed slag refining layer which is for use in the metal melting method using the electric arc furnace of the present invention; and, FIGS. 6, 7, and 8 are, respectively, a top view, a cross-sectional view, and a front view of one embodiment of a raw material charging apparatus attached to the electric arc furnace of the present invention.

In view of the fact that the molten metal drops 25 arc of from less than 0.1 mm. to about 1.0 mm in size and are present in great numbers in every part of the slag layer 24, as shown in FIG. 5, and also in view of the great quantity of sulfur contained in the slag layer, it can be easily understood that the molten metal in the form of sprays has been completely deoxidized and desulfurized by the passage through the slag layer 24.

The slag layer containing $CaC_2$ as a main ingredient may have a small quantity of lime (CaO), fluorspar ($CaF_2$) and the like mixed therewith. Because of its high melting point, layer 24 does not melt but stays in the half-molten state all the time, floating on the surface of the molten metal. It is fed from the charged raw materials intentionally mixed with $CaC_2$ and the like.

The Fe—Si, SiC, etc. added to the raw materials are for the adjustment of the Si content of the pig iron. Also, carbon powder is added to the raw materials mainly for increasing their carbon content according to the mixing ratio of iron and steel chips. This is also for maintaining the atmosphere in the furnace strongly reductive, as mentioned above, since a part of the so added carbon powder is used to produce CO by the high temperature of the arc, which is subjected to a chemical reaction represented by $2CO \rightarrow [C] + CO_2$ during its passage through the charged raw materials. Such carbon [C] which is considered to be in the nascent state, is unstable, and very active, therefore, it may be very effective in increasing the carbon content of molten iron and also in oxidizing the same. In case the furnace is not closed or sealed as in the conventional methds, [C] is liable to change to $CO_2$ subject to the chemical reaction of $[C] + 2O \rightarrow CO_2$, not only lowering the efficiency of the furnace but also harming its operation.

Thus, according to the melting method te present invention, steel chips of low carbon content can be used, which is yet another merit to be added to the list of merits derived from refining molten metals according to the method described above.

Further, concerning oxides of Si, such substances are considered to be present in a state of suspension, or molecular solution, in view of the cause of their production. It is known that suspended silicic acid tends to hinder nodulization of cast iron, and pelletize graphite. Therefore, an excessive content of suspended silicic acid greatly affects the casting of cast iron. That is to say, this degrades the flow rate of molten iron, and makes it sticky, causing not only a bad effect in skin formation in castings, and requiring a great quantity of nodulizing agent, but also producing such defects as shrinkage cavities, pin holes, and drossy scum in castings. Such castings are not valuable commercial products, since these defects, once produced, can be removed only with great difficulty. In the case of melting in conventional electric arc furnaces, oxides of Si are produced without exception, and can be eliminated only with difficulty. This is a cause of a great part of the trouble associated with casting iron.

In the melting method off the present invention, however, the production of such oxides of Si as mentioned above can be nearly completely prevented, for the following reasons: melting is carried out at high temperatures produced by the arc, the atmosphere in the furnace is maintained so strongly reductive as to realize the deoxidation through reduction, solid carbon [C] of high activity produced through the decomposition of carbides is used, raw materials in the form of chips are used, and molten metals are made into sprays or small drops to be filtered and refined by the passage through the slag layer. When using the electric arc furnace of the present invention and the melting method using such furnace, it is possible to produce molten cast iron of good quality, that is, cast iron which is high in nodulizing capacity, and excellent in mechanical properties, and which can be cast into castings having very few of such defects as shrinkage cavities, pin holes and drossy scum. This high quality cast iron can be made from raw materials of inferior quality, such as iron and steel chips in powder or granular form. The metals which have been melted and refined according to the method described above stay in the molten metal hearth 26 after having passed through the slag layer. But, as the tapping spout 7 is of the syphon system, as mentioned above, the molten metals are tapped continuously into the fore-furnace 15.

The above description about the electric arc furnace of the present invention and the cast iron melting method using the furnace does not mean that the practice of the present invention is so limited. The furnace and method are also applicable to steel, aluminum, and other metals, as well as cast iron. Raw materials for the electric arc furnace of the present invention are mostly of the powder or granular form. In the particular case of melting cast iron, granular iron or pellets of ordinary iron scaps may be used, as well as iron and steel chips. It is also possible for a large size electric arc furnace of the presently disclosed type to use scraps of ordinary size, as well as granules or pellets. Such iron and steel chips are obtainable in the process of cutting steel into various parts at machinery manufacturing plants.

The molten cast iron produced by the cast iron melting method of the present invention using the electric arc furnace of the present invention, is of such good quality that it has been completely deoxidized and desulfurized. Particularly when such molten iron is used for making nodular graphite cast iron, it has been observed that the use of nodulizing agents is greatly reduced as can be seen in the following examples, and that the mechanical properties of castings so made are superior to that of castings made of nodular graphite cast iron of the ordinary type. In addition, the volume of feeder head can be reduced to almost nothing, resulting in the rise of casting yield to about 90%.

As compared with the conventional three-phase electric arc furnace having three electrodes arranged so as to form a regular triangle, the three-phase electric structure other than the arrangement of electrodes and in operating condntion of electrodes. The operation as a whole is as easy as the conventional furnace. Moreover, the present furnace consumes electricity in the same, or smaller amounts, than the conventional furnace, proving an improvement from the economical standpoint.

In the following examples illustrating the use of the present invention, calcined electrodes were used, and the electrical automatic control operated well and was successful in the melting operation using such electrodes.

The following is an outlined description of the examples of the present invention.

EXAMPLE 1

(1) Operation conditions:
Transformer capacity: 1350 KVA
Electrode (calcined) diameter: 8 inches
Secondary voltage: 60 V
Secondary current ampere: 7500 – 8000 A (2) Raw materials charged:
Pig Iron cutting chips (A) : 1000 kg/hr
Pig iron cutting chips (B) : 300 kg/hr
$CaC_2$ powder : 13 kg/hr
carbon powder: 1.3 kg/hr
Note: The content of the above pig iron cutting chips (A): C : 3.12%; Si : 2.15%
The content of the above pig iron cutting chips (B) : C : 3.2% Si : 1.9%
As a result of the above operation, the output of molten pig iron was 1300 kg/hr. The chemical composition of this molten iron was: (The sulfur content of the charged pig iron cutting chips was 0.08%)
C : 3.53% Si : 2.1% Mn: 0.57%; P: 0.058% S :0.007%

The above molten pig iron got engrain with a commercial nodulizing agent ($MgF_2$ — $RF_3$ — Ca—Si series) 0.6% and Fe—Si (75%) 0.5%, so that the following nodular graphite cast iron was obtained:
Chemical composition: C: 3.48%; Si : 2.54%; Mn : 0.56% P : 0.58%; S : 0.007%
Mechanical properties: Tensile strength: 63 kg/mm$^2$; Elongation: 10%

EXAMPLE 2

(1) Operation conditions:
Transformer capacity: 1350 KVA
Electrode (calcined) diameter: 8 inches
Secondary voltage: 55V
Secondary current ampere: 6500 A
2. Raw materials charged:
Pig iron cutting chips : 800 kg/hr
Steel cutting chips: 250 kg/hr
$CaC_2$ powder: 15 kg/hr
Carbon powder : 7.5 kg/hr As a result of the above operation, the output tapping of molten pig iron was 1,000 kg/hr. The chemical composition of this molten pig iron was:
C : 3.6%; Si : 2.1%; P : 0.045% ; S : 0.006%
The above molten pig iron got engrained with the same nodulizing agent as used in Example 1, 0.6% and Fe—Si 0.5%, so that the following nodular graphite cast iron was obtained:
Mechanical properties: Tensile strength: 62 kg/mm$^2$; Elongation: 12%
There were produced far fewer casting defects in casting made of this molten cast iron than in casting made by conventional methods; that is, a decrease in inferior goods by 20% and an improvement of yield by 13% were obtained.

EXAMPLE 3

1. Operating Conditions:
Transformer capacity: 1350 KVA
Electrode (calcined)diameter 8 inches
Secondary voltage: 50 V
Secondary current ampere: 7000 A
2. Raw materials charged:
Pig iron cutting chips (A): 500 kg/hr
Steel cutting chips: 500 kg/hr
$CaC_2$ powder: 15 kg/hr
Fe—Si (75%) : 13.5 kg/hr As a result of the above operation, the output molten pig iron was 1,000 kg/hr. The chemical composition of this molten pig iron was:
C : 3.58%; Si: 2.05%; Min: 0.53%; P : 0.045%; S : 0.005%

The above molten pig iron got engrained with the same nodulizing agent as used in Example 1, 0.6% and Fe—Si (75%) 0.5%, so that the following nodular graphite cast iron was obtained:
Mechanical properties: Tensile strength: 64 kg/mm$^2$; Elongation: 13%

In the case of Example 3, the electric arc furnace of the present invention proved of nearly the same melting effect as the conventional electric arc furnace having three electrodes arranged so as to form a regular triangle. The former consumed 568 KWH/T of power, while the latter 575 KWH/T. As a result of practice in commercial plants, operating conditions of the furnace and the method of the present invention have been firmly established.

Having now fully described the invention, it will be apparent to one or ordinary skill in the art that many changes and modifications can be made thereto without departing from the spirit and scope of the Claims. Accordingly,

What is claimed as new and desired to be secured by Letters Patent of the United States is:

1. A method of melting and refining cast iron in an electric arc furnace of the closed type comprising the steps of:
    generating an electric arc in said furnace using suitable electrodes;
    charging raw materials into said furnace, said charging being accomplished so that said raw materials form heaps around said electrodes and cover said arc;
    maintaining a reductive atmosphere and a positive pressure in said furnace using gas generated within said furnace;
    melting said heaped raw materials so that fresh raw materials slide down, section by section, into said arc to be melted into drops of molten metal;
    forming a layer of slag from a basic material having a melting point higher than that of the molten metal;
    removing oxygen and sulfur from said molten metal by passing said drops of molten metal through said layer of slag; and
    continuously tapping said molten metal after passage through said layer of slag.

2. A method of melting and refining cast iron in an electric arc furnace of the closed type as in claim 1, further comprising the step of:
    adding nascent carbon to said molten metal for removing oxides of silicon therefrom.

* * * * *